United States Patent
Hudgins

[11] 3,875,670
[45] Apr. 8, 1975

[54] ROUTING TEMPLATE
[76] Inventor: J. W. Hudgins, 217 S. Broadway, Hobart, Okla. 73651
[22] Filed: Jan. 12, 1973
[21] Appl. No.: 322,960

[52] U.S. Cl............................ 33/174 G; 144/144.5
[51] Int. Cl. ................................................ G01b 3/14
[58] Field of Search................ 33/174 G; 144/144.5; 248/226 A, 386; 403/389, 339, 340; 211/182, 177

[56] References Cited
UNITED STATES PATENTS
3,540,130  11/1970  French............................. 33/174 G Primary Examiner—Richard E. Aegerter
Assistant Examiner—Willis Little
Attorney, Agent, or Firm—Laney, Dougherty, Hessin & Fish

[57] ABSTRACT

A routing template which has flanged elongate bars that slidingly interconnect to frame and overlap the edges of a workpiece so as to provide rigid parallel edges in spacial relationship to the workpiece surface. Brackets may be disposed in corner positions to enable adjustment to the shape of the workpiece and to secure the flanged elongate bars against the edges of the workpiece.

4 Claims, 5 Drawing Figures

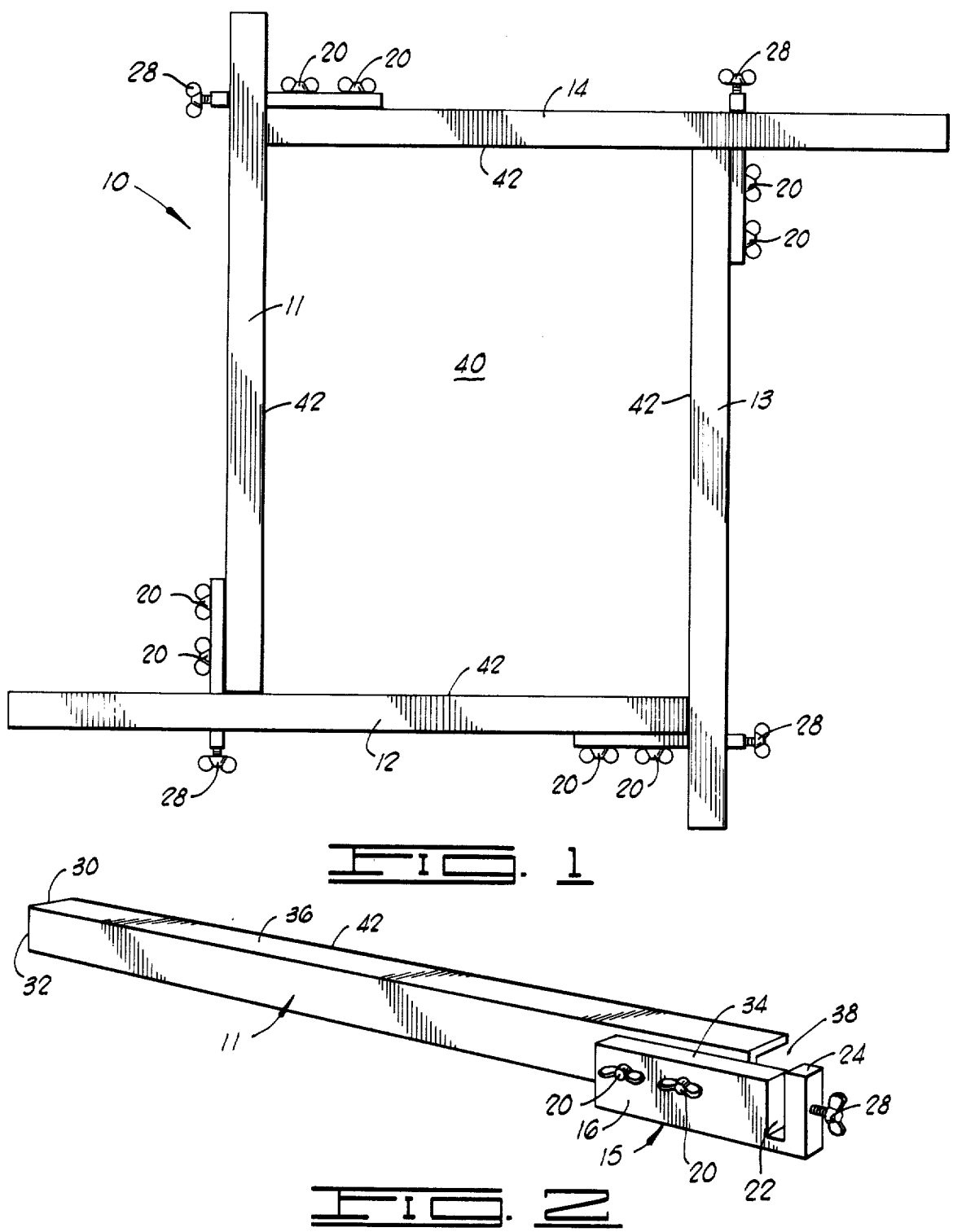

ROUTING TEMPLATE

BACKGROUND OF THE INVENTION

1. Field of the Invention

The present invention relates to a template which provides guiding edges for the use of a router or the like to cut apertures or grooves in a workpiece. More particularly, it relates to cutting decorative designs in cabinet doors and the like.

2. Brief Description of the Prior Art

In custom cabinet work, there have been many designs of templates to aid in the cutting of decorative apertures or designs in doors, panels and the like, but each of these has involved rather complicated structure to achieve that end.

Typically, previously designed templates are comprised of: members which engage with a workpiece and which establish a reference relationship thereto; means of holding template designs to provide the guiding edges from which a router bit is guided; and a scheme for providing adjustability, usually involving complex corner brackets as those shown in French, U.S. Pat. No. 3,540,130 and Wing. U.S. Pat. No. 3,199,556, such corner brackets having apertures or recesses to grasp adjacent members and to hold template inserts.

Previously designed templates generally have many components which often make them difficult to adjust and maintain. They are generally fragile and complicated to the point of requiring special handling and care, especially during storage. The usual scheme, as illustrated in Drain U.S. Pat. No. 2,652,886, involves a series of components which grasp a workpiece, with such components having brackets or the like to hold a template in spacial relationship to the surface of the workpiece. Many of the devices previously used have the further disadvantage of non-interchangeability of component parts, since each part is unique in its role within the apparatus.

BRIEF DESCRIPTION OF THE PRESENT INVENTION

The present invention provides an apparatus with a minimum number of components which frame a workpiece and provide rigid parallel edges in spacial relationship to the workpiece, said edges providing the guiding edges for a router or the like to cut apertures or grooves in the workpiece. The invention is particularly useful because of the interchangeability of the flanged elongate bar members. The simplicity of design of the corner brackets affords ease of operation, thus requiring a minimum of time for set up and disassembly. The flanged elongate bars and corner brackets may be stored in a minimum of space and without special regard as to their care.

Briefly described, the apparatus is comprised of several elongate bars, each of L-shaped or flanged cross-sectional configuration, and securing corner brackets or the like which receive said bars in interslidable and interconnectable relationship. The flanged elongate bars are placed against the edges of a workpiece which is to receive apertures or grooves by the use of a router or the like. The flanges of said bars overlap the edges of the workpiece and provide a rigid, parallel edge along which the reference spindle of the router is caused to move, thereby directing the cutting bit of the router against said workpiece in a planned pattern.

The present invention discloses a routing template which frames a workpiece and which provides guiding edges for a router spindle in a manner which requires the minimum number of components and which affords a maximum ruggedness and durability.

It is an object of the present invention to provide a routing template which is adjustable to fit any size or shape of multi-sided workpieces.

Another object of the present invention is to provide a simple template design with a minimum number of components which is inexpensive to manufacture.

Another object of the present invention is to provide a template which frames the workpiece and can be used with or without inserts for routing functional or decorative apertures or designs in a workpiece.

Another object of the present invention is to provide a template which is rigid, durable and accurate so as to improve the quality of work and reduce possible error.

Another object of the present invention is to provide a template which is easily assembled and disassembled, and which can be easily stored without special consideration or containers.

Other objects and advantages of the present invention will become apparent from the following detailed description of preferred embodiments of the invention, considered in conjunction with the accompanying drawings.

BRIEF DESCRIPTION OF THE DRAWINGS

FIG. 1 is a top or plan drawing of the template framing a workpiece.

FIG. 2 is a perspective view of a corner bracket attached to an elongate bar member forming a subassembly of the template.

DETAILED DESCRIPTION OF A PREFERRED EMBODIMENT OF THE INVENTION

Figure 3:
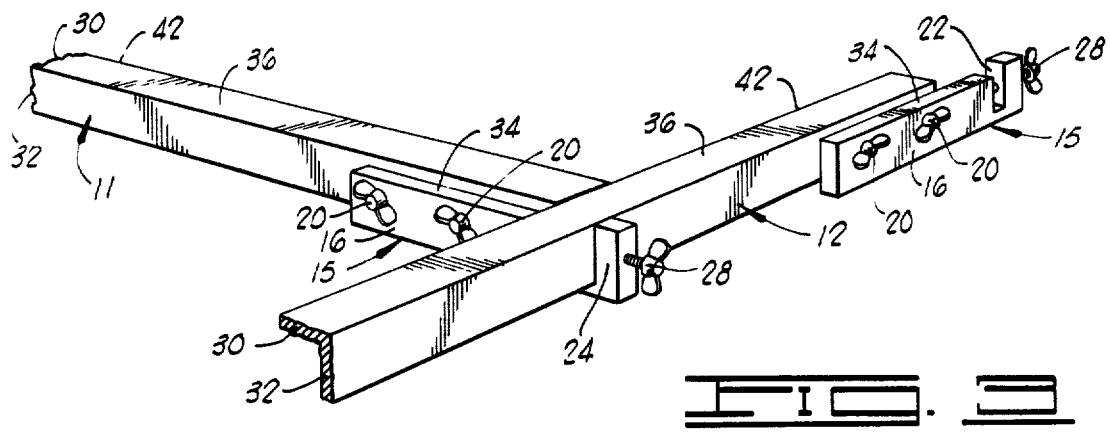
FIG. 3 is a perspective view showing the manner in which an elongate bar member is received in slidable relationship to a corner bracket in the template assembly.

Referring to the drawings in greater detail, FIG. 1 shows a routing template indicated generally at 10. The template 10 is comprised of four elongate bars or angle members 11, 12, 13 and 14 of L-shaped cross-sectional configuration. It will be understood that for purposes of illustration herein, four such members are shown, but that it is possible to apply the principles of the present invention to a template having many sides made up of a greater number of such members. The elongate bars 11–14 are identically constructed, except that differing lengths may be utilized as required. The following discussion, therefore, will describe only the elongate bar 11 as typical of the construction of each of the elongate bars 11, 12, 13 and 14.

The elongate bar 11 is shown enlarged and illustrated in FIG. 2. The elongate bar 11 includes a first or top flange 30 and a second flange 32 which extends almost to the top flange 30. The flange 30 terminates in an elongated edge 42, and has an upwardly facing surface 36.

Figure 4:
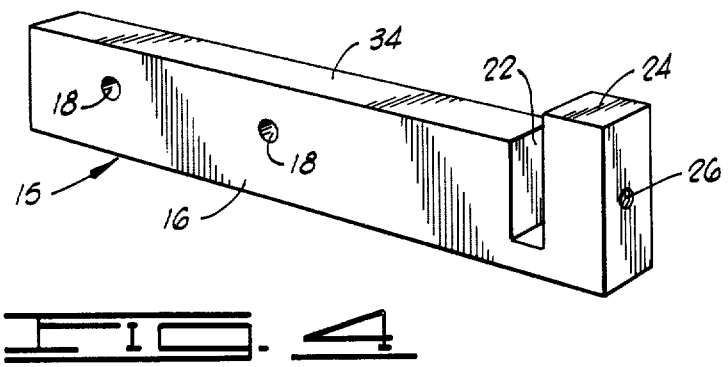
FIG. 4 is a perspective view of a corner bracket.

At one end of the elongate bar 11 is attached the corner bracket 15. As illustrated in FIG. 4, which shows a perspective view of corner bracket 15, the body 16 of this bracket has one or more apertures 18 located therein for alignment with identically spaced and threaded apertures (not shown) in each of the elongate bars 11-14 so that bolts 20 or the like can be threadedly engaged therewith to permanently secure one of the corner brackets 15 to each of the elongate bars.

It will be seen in FIG. 4 that the corner bracket 15 has a slot 22 transverse to the longitudinal axis of the body 16, which slot defines a riser 24 disposed at the end of corner bracket remote from the elongate bar to which it is secured, as most clearly shown in FIG. 2. Each corner bracket 15 may be described as L-shaped in configuration with the riser 24 forming one of the legs thereof. Each riser 24 has a threaded aperture 26 which passes completely through the riser parallel to the longitudinal axis of body 16. As shown in FIG. 2, a set screw 28 is threadedly engaged with the said aperture 26, and is of sufficient length to extend through the threaded aperture into the slot 22. The body 16 of corner bracket 15 is cut longitudinally from the slot 22 to the remote end of the corner bracket so that the width dimension of the body 16 differs from the depth dimension of the slot 22 by an amount which allows the flange 30 of elongate bar 12 to be aligned with the flange 30 of the bar 11 when the template is partially assembled as shown in FIG. 3. In FIG. 2 it will be noted that the corner bracket 15 is depicted as projecting at its lower edge below the lower edge of the flange 32 by an amount at least equal to the thickness of the flange 30. Slot 22 in each of the respective corner brackets 15 slidably receives the flange 32 of another of the elongate bars (such as the elongate bar 12 as shown in FIG. 3) other than the elongate bar to which the respective corner bracket is attached.

Because the elongate bars 11-14 are identically constructed, the slot 22 in each corner bracket 15 will accept, in like manner, any of the other elongate bars as randomly selected to be placed adjacent the elongate bar to which the respective corner bracket is secured. Each corner bracket 15 is joined to its respective supporting elongate bar so that the surface 34 of the corner bracket (see FIG. 4) is spaced from the top surface 36 of the top flange 30 of the respective elongate bar by a distance substantially equal to the thickness of the flange 30.

The disposition of each corner bracket 15 on its respective elongate bar is established so as to provide a space 38 between the end of the elongate bar to which the corner bracket is secured, and the riser 24 of the respective corner bracket, such that the space 38 and the slot 22 will receive the elongate bar placed therein as demonstrated by the illustrated reception of the elongate bar 12 in FIG. 3. Because of the displacement of surface 34 in the manner described, the top surface 36 of the flange 30 of elongate bar 11 will be substantially coplanar with the top surface 36 of the adjacent elongate bar 12 when it is placed in the corner bracket 15.

In the manner described above for the interconnection of the elongate bars 11 and 12, each of the remaining elongate bars 13 and 14 are interconnected with elongate bars 11 and 12 through the respective corner brackets 15. Thus, each elongate bar 11-14 has a corner bracket 15 attached to only one of its ends. Each elongate bar, by means of its respectively attached corner bracket, slidingly engages an adjacent elongate bar, while at the end opposite to its corner bracket, it is engaged by the adjacent elongate bar's corner bracket. When each elongate bar is thus placed to hold and to be held by its adjacent elongate bars, the elongate bars 11-14 form a polygonal framework which will frame a workpiece 40 in the manner shown in FIG. 1. A rectangularly shaped workpiece is illustrated for illustrative purposes.

OPERATION OF THE PREFERRED EMBODIMENT

In operation, a workpiece is conveniently laid flat on a table, and an elongate bar with its attached corner bracket is placed at each edge of the workpiece so as to outline the workpiece. Each elongate bar is placed so as to engage an adjacent elongate bar in its corner bracket in the manner shown in FIG. 1. In this manner, a workpiece 40 is framed and longitudinal edges 42 of the elongate bars form a rigid straight perimeter parallel to the outer edge of the workpiece material. The edges 42 may be used to guide a router or cutter for scoring or grooving workpiece 40 for attractiveness or utility.

In the manner above described, the template 10 is caused to frame the workpiece 40. Additionally, design elements may be placed on the material inside the elongate bars in a conventional manner in order to form various shapes of grooves, thereby enhancing the appearance of the workpiece.

The described routing template has proven to be rugged and durable as well as highly accurate for the cutting of apertures or grooves in a workpiece, especially where the workpiece is a cabinet door or the like. The embodiment herein described requires a minimum of time to assemble around the workpiece, and it is easily disassembled, due to simplicity of design and interchangeability of the component parts. The corner brackets are of a simple and yet effective design and are therefore inexpensive to manufacture, in contrast to corner brackets of previous designs. A favorable feature of the described embodiment is the ease of storage due to the small storage space required by the elongate bar members and due to the fact that no special storage container is required. This also is in contrast to previous designs of template apparatus which must be given special consideration during storage. Another very substantial advantage of the present template design is the low overall cost of manufacture for the complete template. This cost is minimal when compared to previously designed templates. Besides having a minimum of components, only common machine shop operations are required in the manufacture of the component parts of the template apparatus herein.

Figure 5:
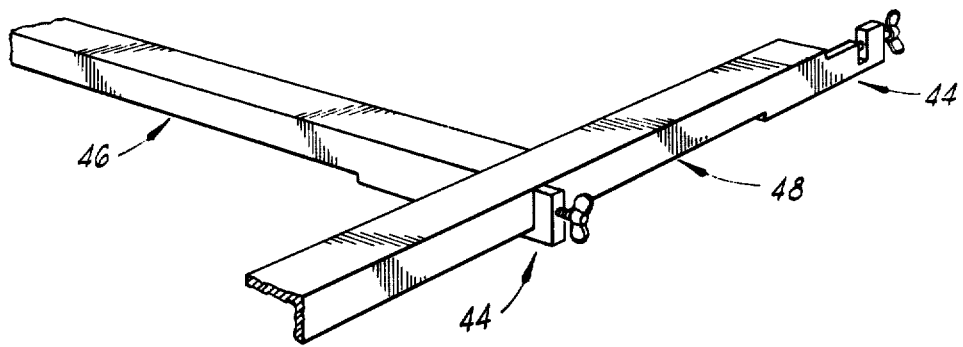
FIG. 5 is a perspective view of an alternate structure which is an integral, elongate bar member with shaped end to provide the corner attaching means.

Another embodiment of the present invention is shown in FIG. 5 wherein a corner bracket 44 is an integral part of an elongate bar 46, being fabricated by the shaping of one end of each of the elongate bars. Otherwise, the details and the operation of interconnectability and interslidability are identical with the characteristics of the elongate bars and corner brackets discussed above.

It will be understood that the elements of the present invention may be fabricated from a variety of materials. Typically, aluminum angle bars are used to fashion the elongate bars. Aluminum may also be used for the corner brackets. Bolts 20 and set screws 28 are conventional wing bolts which can be hand adjusted.

Another embodiment of the present invention is represented by the use of magnetic material to fashion the components herein. By causing the corner brackets to be magnetized, it is possible to then eliminate the set screws 28. In this embodiment of the invention, the elongate bar members are held in firm position while framing the workpiece by the strong magnetic attracting forces exerted on the elongate bars by the securing corner brackets.

It will be understood that changes may be made in the construction and the arrangement of the parts or the elements of the various embodiments as disclosed herein without departing from the spirit and scope of the invention as described in the following claims:

What is claimed is:

1. An adjustable routing template for use in cutting recesses or grooves in a workpiece comprising:
   a plurality of substantially, identically cross-sectioned, elongated, rigid angle members of L-shaped cross-section, each having a pair of flanges interconnected at a right angle to each other;
   a plurality of corner brackets equivalent in number to said angle members, and each secured to one of the flanges of one of said angle members and projecting beyond one end of the respective angle member to which it is secured, each of said corner brackets having a transverse slot formed in an end portion thereof and spaced from said one end of the angle member to which the corner bracket is secured, and slidably receiving in said slot, said one flange of a different one of said angle members, the second flange of said different one of said angle members resting upon a portion of its receiving corner bracket and lying in coplanar relationship to the second flange of the angle member to which said receiving corner bracket is secured, said transverse slot being spaced from the end of said second flange of the angle member to which said receiving bracket is secured by a distance equivalent to the width of the second flange of said different one of said angle members, whereby edges of the second flanges of the two angle members joined through each corner bracket abut each other and define an unobstructed angle equivalent to the angle made between the intersecting side edges of the second flanges of the joined angle members; and
   means associated with each corner bracket for securing the angle member received therein to said corner bracket at a selected location along the length of said received angle member, said angle members and corner brackets being interconnected to form a frame of closed polygonal configuration having the second flanges of all of said angle members lying in substantially a single plane, and having said one flange of each of said angle members extending substantially normal to said plane and positioned for collectively engaging the peripheral edges of a work piece to be routed through the use of said template.

2. An adjustable routing template as claimed in claim 1 wherein each of said corner brackets is of L-shaped configuration, and the transverse slot therein is at the intersection of the two legs of each L-shaped corner bracket, each of said transverse slots having a depth equivalent to the dimension of said one flange slidably received therein as measured from inside the angle defined by the angle member carrying said one flange slidably received therein.

3. An adjustable routing template as defined in claim 1 wherein each of said securing means comprises a member extending through one of said corner brackets into the slot therein from a side thereof farthest from the respective angle member to which the corner bracket carrying the securing means is secured whereby each of said securing means is accessible from outside said frame and is not obstructed from above by said frame when said frame is horizontally positioned.

4. An adjustable routing template as defined in claim 3 wherein each of said corner brackets is of L-shaped configuration, and the transverse slot therein is at the intersection of the two legs of each L-shaped corner bracket, each of said transverse slots having a depth equivalent to the dimension of the angle member flange slidably received therein as measured from inside the angle defined by the angle member.

* * * * *